(12) United States Patent
Adachi et al.

(10) Patent No.: US 10,364,889 B2
(45) Date of Patent: Jul. 30, 2019

(54) SPEED CHANGE APPARATUS FOR POWER UNIT

(71) Applicant: HONDA MOTOR CO., LTD., Tokyo (JP)

(72) Inventors: Jun Adachi, Wako (JP); Takashi Ozeki, Wako (JP); Yoshiaki Tsukada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 610 days.

(21) Appl. No.: 15/079,051

(22) Filed: Mar. 24, 2016

(65) Prior Publication Data

US 2016/0281822 A1 Sep. 29, 2016

(30) Foreign Application Priority Data

Mar. 27, 2015 (JP) .................................. 2015-067588

(51) Int. Cl.
| | |
|---|---|
| *F16H 63/18* | (2006.01) |
| *F16H 3/00* | (2006.01) |
| *F16H 3/089* | (2006.01) |
| *F16H 63/32* | (2006.01) |

(52) U.S. Cl.
CPC ............. *F16H 63/18* (2013.01); *F16H 3/006* (2013.01); *F16H 3/089* (2013.01); *F16H 2063/322* (2013.01)

(58) Field of Classification Search
CPC ..... F16H 63/18; F16H 3/006; F16H 2063/322
USPC ........................ 74/55, 56, 57, 424.91, 424.93
See application file for complete search history.

(56) References Cited

U.S. PATENT DOCUMENTS

| | | | | | |
|---|---|---|---|---|---|
| 2,258,114 | A | * | 10/1941 | Johnson .................. | F16H 25/12 74/568 R |
| 2,353,313 | A | * | 7/1944 | Lane ...................... | F01B 3/0032 123/56.7 |
| 3,308,674 | A | * | 3/1967 | Maroth ............... | F16H 25/2261 74/424.93 |
| 3,766,788 | A | * | 10/1973 | Metz ................... | F16H 25/2261 74/424.94 |
| 3,802,290 | A | * | 4/1974 | Grove ..................... | B66B 9/025 74/424.91 |
| 4,008,625 | A | * | 2/1977 | Malhotra ............ | F16H 25/2006 74/424.93 |

(Continued)

FOREIGN PATENT DOCUMENTS

| | | | |
|---|---|---|---|
| JP | 57-154548 | * | 9/1982 |
| JP | 2009-156375 | | 7/2009 |

*Primary Examiner* — William C Joyce
(74) *Attorney, Agent, or Firm* — Mori & Ward, LLP (57) ABSTRACT

A cylindrical shift drum is rotatable around a third rotational axis. The cylindrical shift drum includes at least one lead groove in an outer circumferential surface of the cylindrical shift drum. A shift fork shaft extending in parallel to the third rotational axis is disposed opposite to the outer circumferential surface. At least one shift fork includes a main portion slidably supported by the shift fork shaft and a pin portion rotatably supported by the main body portion. The main body portion includes a fork portion to be engaged with at least one shifter gear. The pin portion is inserted in one of the at least one lead groove. The cylindrical shift drum is to be rotated to guide the pin portion along the one of the at least one lead groove to move the at least one shift fork to shift the at least one shifter gear.

10 Claims, 10 Drawing Sheets

(56) References Cited

U.S. PATENT DOCUMENTS 5,191,805 A * 3/1993 Parsons ............... F16H 25/2261
  74/424.93
5,680,795 A * 10/1997 Parsons ............... F16H 25/2261
  74/424.93

* cited by examiner

SPEED CHANGE APPARATUS FOR POWER UNIT

CROSS-REFERENCE TO RELATED APPLICATIONS

The present application claims priority under 35 U.S.C. § 119 to Japanese Patent Application No. 2015-067588, filed Mar. 27, 2015. The contents of this application are incorporated herein by reference in their entirety.

BACKGROUND OF THE INVENTION

Field of the Invention

The present invention relates to a speed change apparatus for a power unit.

Discussion of the Background

A configuration of an automated manual transmission (AMT) is disclosed in Japanese Patent Laid-Open No. 2009-156375. This AMT includes a main shaft, a counter shaft, slidable gears mounted to the shafts so as to be slidable in the axial direction, a shift drum formed in its surface with guide grooves, shift forks each provided with a projected portion for engagement with the guide groove of the shift drum and a guide claw for engagement with the slidable gear. The shift fork, by being guided by the guide groove of the shift drum rotationally driven by a shift controlling motor, slides the slidable gear to establish a shift position.

SUMMARY OF THE INVENTION

According to one aspect of the present invention, there is provided a speed change apparatus for a power unit, including: a main shaft on which a plurality of driving gears are supported; a counter shaft on which a plurality of driven gears are supported; shifter gears included in the driving gears and the driven gears; a cylindrical shift drum formed with lead grooves in an outer circumferential surface thereof; a plurality of shift forks each provided with a fork portion and a pin portion, the fork portion being engaged with the shifter gears, and the pin portion being locked in the lead groove of the shift drum; and a shift fork shaft disposed in parallel to an axial direction of the shift drum and supporting the shift forks in an axially movable manner.

Gear shift is established by a process in which the shift fork guided by the lead groove of the shift drum and moved in the axial direction moves the shifter gears in the axial direction.

The speed change apparatus has a configuration in which: the shift forks each include a main body portion which is provided with the fork portion, and the pin portion of each of the shift forks is provided as a separate body from the main body portion and is rotatably supported by the main body portion.

According to another aspect of the present invention, a speed change apparatus for a power unit includes a main shaft, a counter shaft, at least one driving gear, at least one driven gear, a cylindrical shaft drum, a shift fork shaft, at least one shift fork. The main shaft is rotatable around a first rotational axis to be driven by an engine. The at least one driving gear is supported on the main shaft to be rotated with the main shaft. The counter shaft is rotatable around a second rotational axis substantially parallel to the first rotational axis. The at least one driven gear is supported on the counter shaft to be rotated with the counter shaft. Each of the at least one driven gear is to be engaged with one of the at least one driving gear. The at least one of the at least one driving gear and the at least one driven gear includes at least one shifter gear movable along the first rotational axis or the second rotational axis. The cylindrical shift drum is rotatable around a third rotational axis substantially parallel to the second rotational axis to be driven. The cylindrical shift drum includes at least one lead groove in an outer circumferential surface of the cylindrical shift drum. The shift fork shaft is disposed opposite to the outer circumferential surface of the cylindrical shift drum not to be rotated with the cylindrical shift drum. The shift fork shaft extends in parallel to the third rotational axis. Each of the at least one shift fork includes a main portion and a pin portion. The main body portion is slidably supported by the shift fork shaft. The main body portion includes a fork portion to be engaged with the at least one shifter gear. The pin portion is rotatably supported by the main body portion. The pin portion is inserted in one of the at least one lead groove of the cylindrical shift drum. The cylindrical shift drum is to be rotated to guide the pin portion of the at least one shift fork along the one of the at least one lead groove to move the at least one shift fork in a direction parallel to the third rotational axis to shift the at least one shifter gear along the first rotational axis or the second rotational axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

A speed change apparatus 4 for a power unit P according to an embodiment of the present invention will be described, referring to the drawings.

Note that in the present specification and claims, the forward, rearward, leftward, rightward, upward and downward directions are those directions with reference to a vehicle, particularly a motorcycle, on which the power unit according to the embodiment of the present invention is mounted. In the drawings, arrow FR indicates the front side (forward direction), arrow RE indicates the rear side (rearward direction), arrow RH indicates the right-hand side (rightward direction), arrow LH indicates the left-hand side (leftward direction), arrow UP indicates the upper side (upward direction), and arrow DW indicates the lower side (downward direction).

Figure 1:
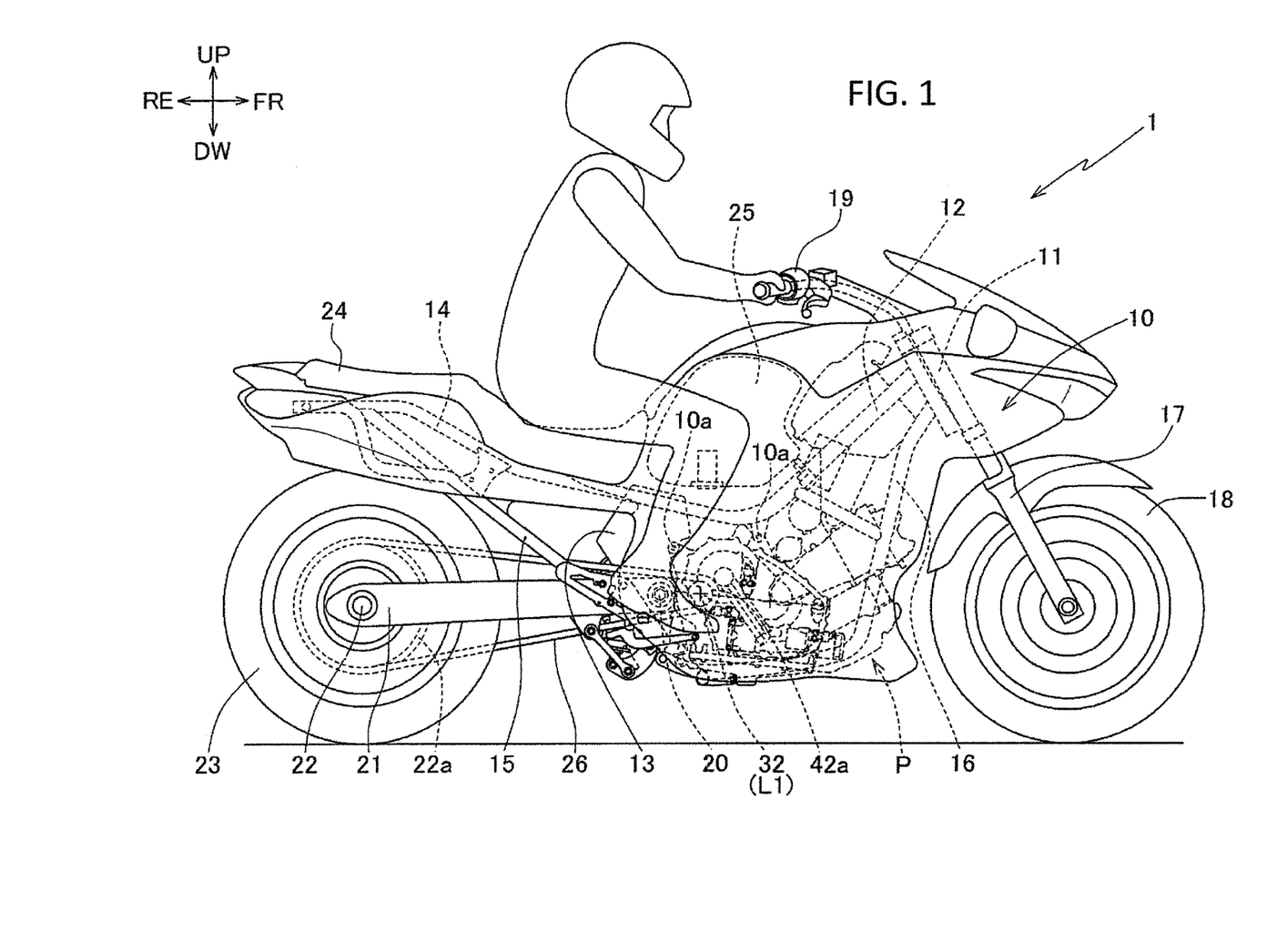
FIG. 1 is a left side view (as viewed generally from the left side) of a motorcycle on which a speed change apparatus for a power unit according to an embodiment of the present invention is mounted.

As shown in FIG. 1, a body frame 10 of a motorcycle 1 includes: a head pipe 11 disposed at a front portion; a main frame 12 extending obliquely rearward and downward from the head pipe 11, curving in its course and extending rearward; a center frame 13 extending downward from a rear end of the main frame 12; a seat stay 14 extending rearward from an upper portion of the center frame 13; a middle stay 15 arranged between a rear portion of the center frame 13 and a rear portion of the seat stay 14; and a down frame 16 extending downward from the head pipe 11.

A front fork 17 which supports a front wheel 18 in a rotatable manner on lower ends thereof is steerably supported on the head pipe 11. A steering handlebar 19 is connected to an upper end portion of the front fork 17. A swing arm 21 is swingably supported on the center frame 13 through a pivot shaft 20. A rear wheel 23 is rotatably supported on a rear end of the swing arm 21 through a rear axle 22.

A rider's seat 24 is mounted on the upper side of the seat stay 14, and a fuel tank 25 is mounted forwardly of the rider's seat 24 and upwardly of the main frame 12.

The power unit P for driving the rear wheel 23 is mounted on the motorcycle 1, while being supported by a plurality of mounting brackets 10a provided on the body frame 10, with a rotational axis L1 of a crankshaft 32 oriented in the transverse direction (left-right direction). An endless chain 26 is arranged between and around a driving sprocket 42a fitted to an output shaft (counter shaft 42) of the power unit P and a driven sprocket 22a fitted to the rear axle 22.

Figure 2:
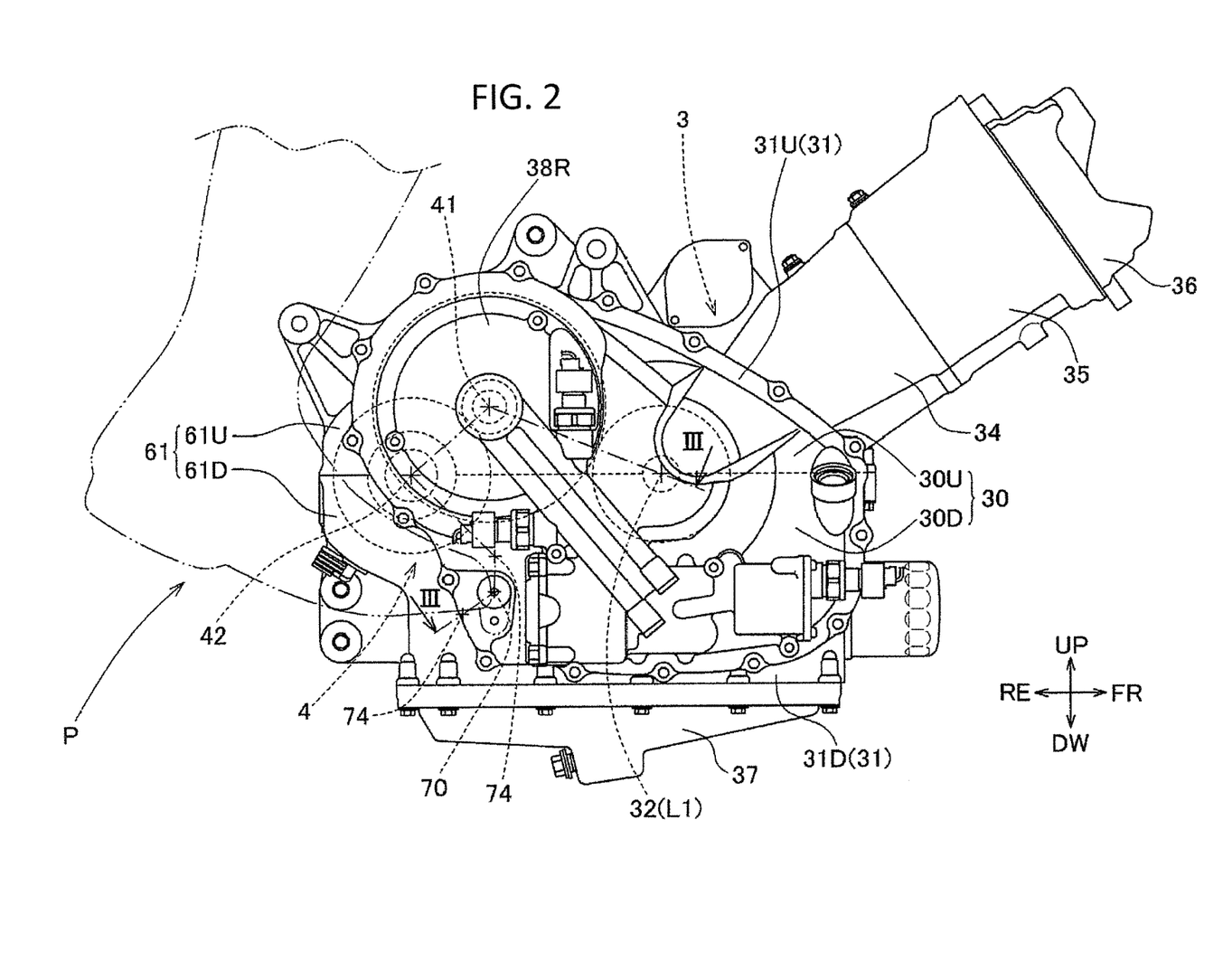
FIG. 2 is a left side view (as viewed generally from the left side) of the power unit of FIG. 1.

As depicted in FIG. 2, the power unit P includes a water-cooled two-cylinder four-stroke-cycle internal combustion engine (hereinafter referred to as internal combustion engine) 3, and the speed change apparatus 4 connected to the rear of the internal combustion engine 3.

The power unit P includes a unit case 30, which includes a crankcase 31 supporting the crankshaft 32 in a rotatable manner and a transmission case 61 accommodating a transmission 40 of the speed change apparatus 4. The crankcase 31 and the transmission case 61 are integrally formed respectively as a front half and a rear half of the unit case 30. The unit case 30 is composed of an upper unit case half 30U and a lower unit case half 30D. The upper unit case half 30U has an upper crankcase half 31U and an upper transmission case half 61U formed integrally. Similarly, the lower unit case half 30D has a lower crankcase half 31D and a lower transmission case half 61D formed integrally.

At an upper portion of the upper crankcase half 31U, there are arranged a cylinder block 34, a cylinder head 35, and a head cover 36 stacked in this order to project in an oblique direction toward a front upper side.

The lower side of the lower unit case half 30D is closed with an oil pan 37.

The right side of the unit case 30 is covered with a right unit case cover 38R. The left side of the unit case 30 is covered with a left unit case cover 38L (see FIG. 3B).

The crankshaft 32 is rotatably supported on the crankcase 31, in the state of being clamped between the upper crankcase half 31U and the lower crankcase half 31D, through bearings (not shown) interposed therebetween.

Figure 3A:
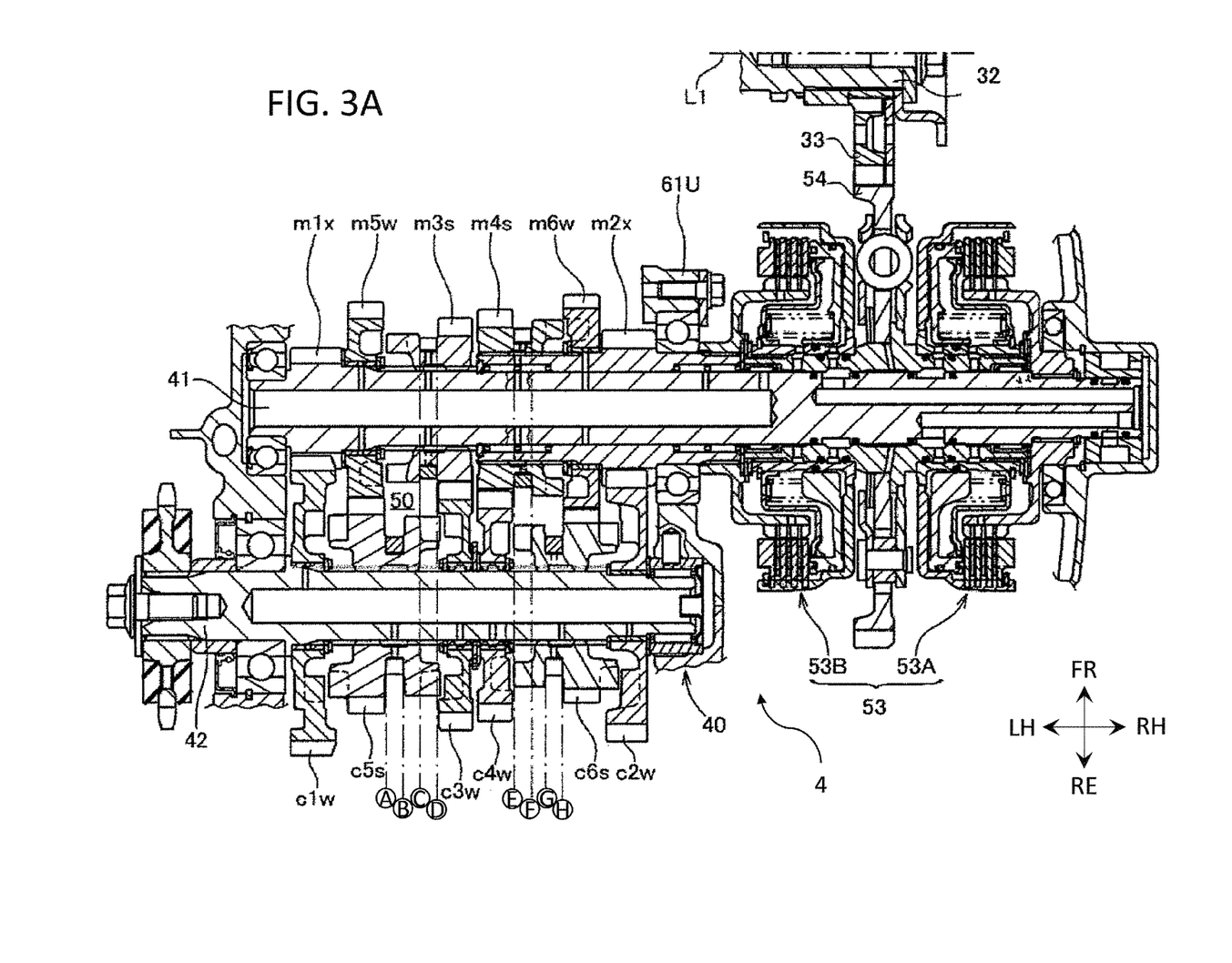
FIG. 3A is a sectional view taken along line III-III of FIG. 2.
Figure 3B:
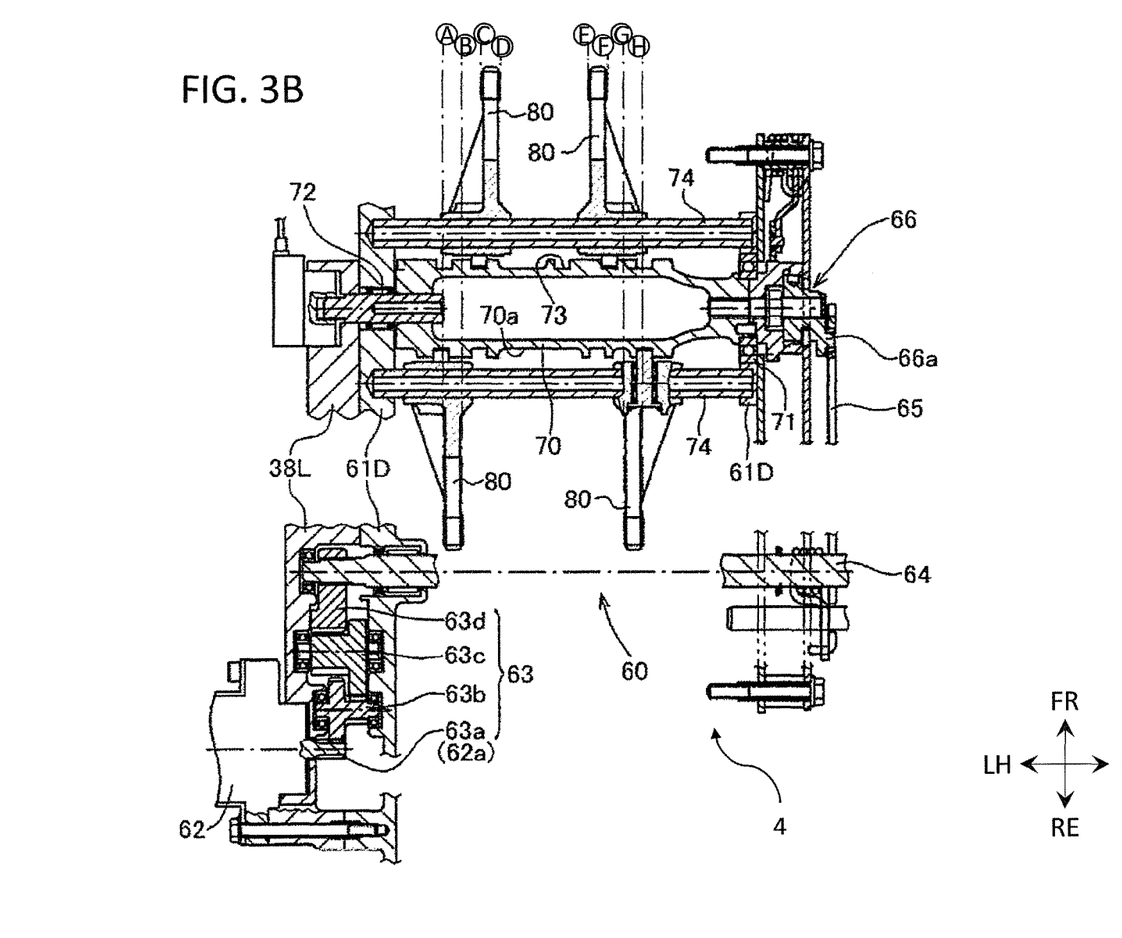
FIG. 3B is a sectional view taken along line III-III of FIG. 2.

As illustrated in FIGS. 3A and 3B, the speed change apparatus 4 for speed change of driving power of the internal combustion engine 3 into a predetermined speed (gear) includes a normally meshed transmission 40, a shift operation mechanism 60 for operating the gear position of the transmission 40, and a clutch mechanism 53.

The transmission 40 includes a main shaft 41 as an input shaft, a counter shaft 42 as an output shaft, and a gear group 50 provided on the main shaft 41 and the counter shaft 42.

Figure 4:
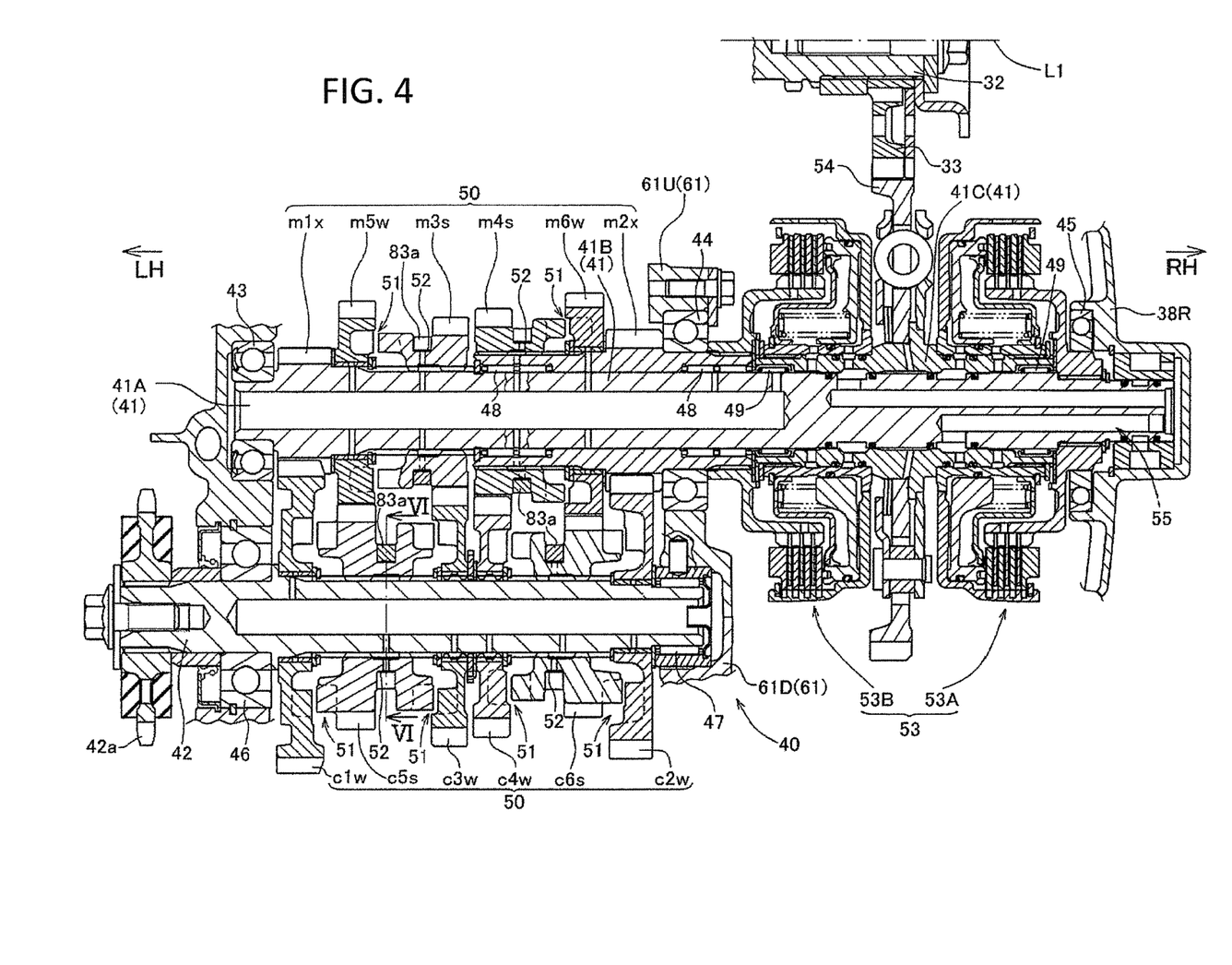
FIG. 4 is an enlarged view of a transmission shown in FIG. 3A.

As shown in FIGS. 2 and 4, the main shaft 41 is disposed in the upper transmission case half 61U, on a rear upper side of the crankshaft 32 and in parallel to the rotational axis L1 of the crankshaft 32. The main shaft 41 is rotatably supported at its left end on the upper transmission case half 61U through a ball bearing 43, at its central portion on the upper transmission case half 61U through a ball bearing 44, and at its right end on the right unit case cover 38R through a ball bearing 45.

The counter shaft 42 is disposed at a position on a rear lower side of the main shaft 41, in the state of being interposed between the upper and lower transmission case halves 61U and 61D and in parallel to the main shaft 41. The counter shaft 42 is rotatably supported on the transmission case 61 in a state wherein its left end penetrates a ball bearing 46, its near-left-end portion is clamped between the upper and lower transmission case halves 61U and 61D through the ball bearing 46, and its right end is clamped between the upper and lower transmission case halves 61U and 61D through a needle bearing 47. The driven sprocket 42a is fitted to the left end of the counter shaft 42.

As depicted in FIG. 4, the main shaft 41 is composed of a long main shaft inner shaft 41A, a main shaft outer shaft 41B, and a clutch portion outer shaft 41C.

The main shaft outer shaft 41B covers a portion ranging from the center of the main shaft inner shaft 41A to the center of a left half of the main shaft inner shaft 41A in a relatively rotatable manner through a needle bearing 48 therebetween.

The clutch portion outer shaft 41C covers a portion ranging from the center to a near-right-end portion of the main shaft inner shaft 41A in a relatively rotatable manner through a needle bearing 49 therebetween.

The main shaft 41 is provided with six driving gears m1 to m6, for transmission gear ratios ranging from first gear to sixth gear. The counter shaft 42 is provided with six driven gears c1 to c6, for transmission gear ratios ranging from first gear to sixth gear. The driving gears m1 to m6 and the driven gears c1 to c6 are to mesh with each other, wherein the driving and driven gears corresponding to second speed, sixth speed, fourth speed, third speed, fifth speed, and first speed are arranged in this order from the right side. The driving gears m1 to m6 and the driven gears c1 to c6 constitute the gear group 50. The driving gears m2, m4, and m6 for even-numbered gear positions are provided on the main shaft outer shaft 41B. The driving gears m1, m3, and m5 for odd-numbered gear positions are provided on the main shaft inner shaft 41A.

In FIG. 4, the suffix x on the signs of the driving gears m1 and m2 represents fixed gears molded integrally with the shaft 41; the suffix w on the signs of the driving gears m5 and m6 and the driven gears c1 to c4 represents free gears that are rotatable relative to the shafts 41 and 42 on which they are supported; and the suffix s on the signs of the driving gears m3 and m4 and the driven gears c5 and c6 represents shifter gears that are rotated integrally with the shafts 41 and 42 on which they are supported and that are movable in the axial direction.

In other words, the first-speed driving gear m1 and the second-speed driving gear m2 are fixed gears; the fifth-speed driving gear m5, the sixth-speed driving gear m6, the first-speed driven gear c1, the second-speed driven gear c2, the third-speed driven gear c3 and the fourth-speed driven gear c4 are free gears; and the third-speed driving gear m3, the fourth-speed driving gear m4, the fifth-speed driven gear c5 and the sixth-speed driven gear c6 are shifter gears.

A dog clutch 51 is provided between each of the shifter gears m3, m4, c5, and c6 and each of the free gears m5, m6, c1, c2, c3, and c4 adjacent respectively to the shifter gears m3, m4, c5, and c6. When one of the shifter gears m3, m4, c5, and c6 comes close to a corresponding adjacent one of the free gears m5, m6, c1, c2, c3, and c4, the dog clutch 51 between the gears under consideration is engaged, whereby the gears under consideration are connected to each other in a relatively non-rotatable manner.

Each of the shifter gears m3, m4, c5, and c6 is formed in an outer circumferential surface thereof with a fork groove 52, for engagement with a fork portion 83 of a shift fork 80 which will be described later, along the circumferential direction.

At a right half of the main shaft 41, there is provided a clutch mechanism 53 including a first hydraulic clutch 53A and a second hydraulic clutch 53B which are disposed on opposite sides of a primary driven gear 54 fitted to a central portion of the clutch portion outer shaft 41C in a relatively non-rotatable manner.

Power of the crankshaft 32 is transmitted to the clutch mechanism 53 through a primary driving gear 33, which is fitted to the crankshaft 32, and the primary driven gear 54. The first hydraulic clutch 53A and the second hydraulic clutch 53B are selectively engaged by a hydraulic circuit 55, whereby the power is transmitted from the crankshaft 32 to the main shaft inner shaft 41A and the main shaft outer shaft 41B.

As shown in FIG. 3B, the shift operation mechanism 60 includes a shift motor 62, a speed reduction gear mechanism 63, a shift spindle 64, a master arm 65, an intermittent feed mechanism 66, a shift drum 70, a shift fork shaft 74 and the shift forks 80. A rotational driving force of the shift motor 62 is speed reduced by the speed reduction gear mechanism 63, before rotating the shift spindle 64. Through the master arm 65 which is rotated as one body with the shift spindle 64, the intermittent feed mechanism 66 intermittently rotates the shift drum 70, whereby the shift forks 80 are moved so as to move each of the shifter gears m3, m4, c5, and c6 of the transmission 40 in the axial direction, thereby shifting the gear position of the transmission 40.

The shift motor 62 is mounted to the left unit case cover 38L on the left-hand side of the lower transmission case half 61D. The speed reduction gear mechanism 63 is provided between the lower transmission case half 61D and the left unit case cover 38L. The speed reduction gear mechanism 63 includes a driving gear 63a formed integrally with a motor shaft 62a of the shift motor 62, first and second gears 63b and 63c composing of large and small gears, and a driven gear 63d fitted to the shift spindle 64.

The shift spindle 64 is rotatably supported on the lower transmission case half 61D at portions near left and right ends thereof through bearings. The master arm 65 is welded to a near-right-end portion of the shift spindle 64 so that the shift spindle 64 and the master arm 65 are rotated as one body.

As depicted in FIG. 3B, the shift drum 70 is formed in a hollow cylindrical shape. On the lower side of the main shaft 41, the shift drum 70 is rotatably supported on the lower transmission case half 61D, at its right end portion through a ball bearing 71 and at its left end portion through a needle bearing 72, so as to be parallel to the rotational axis L1 of the crankshaft 32.

The intermittent feed mechanism 66 for intermittently rotating the shift drum 70 is provided at a right end portion of the shift drum 70. The intermittent feed mechanism 66 is connected to the master arm 65 through a pin 66a.

Figure 5:
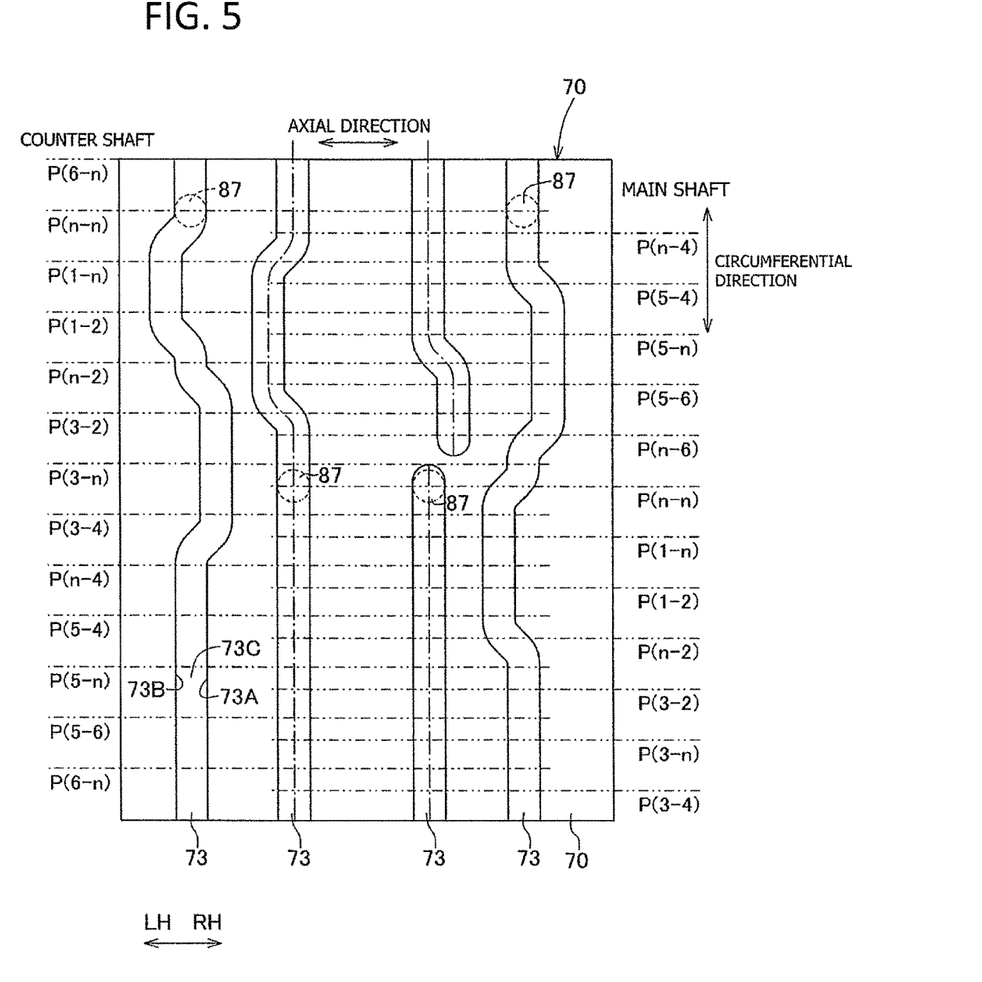
FIG. 5 is a development of lead grooves of a shift drum.

As illustrated in FIGS. 3 and 5, the outer circumferential surface of the shift drum 70 is provided with four lead grooves 73. As shown in FIG. 5, each lead groove 73 is surrounded on three sides by three wall surfaces composing of a right wall surface 73A, a left wall surface 73B and a bottom wall surface 73C of a space which is recessed from the outer circumferential surface 70a of the shift drum 70 in a radially inward direction with respect to the shift drum 70. In addition, the lead groove 73 is formed in a pattern along the circumferential direction of the shift drum 70, while being partially offset in the axial direction of the shift drum 70. At each of the offset portions, the left and right wall surface portions 73A, 73B of the lead groove 73 are formed with slant wall surfaces 73D which are slant with reference to the axial direction of the shift drum 70.

Note that in FIG. 5, signs P(n-n) and the like represent gear positions in the transmission 40. In each sign, the left-hand numeral in the parentheses indicates an odd-numbered gear position, whereas the right-hand numeral indicates an even-numbered gear position. In addition, the broken-line circles represent pin portions 87 of the shift forks 80 which will be described later.

Taking FIGS. 2 and 3 into consideration, on the upper side and left side of the shift drum 70, the shift fork shaft 74 is supported in parallel to the shift drum 70, with both its ends fitted to the lower transmission case half 61D. On the shift fork shafts 74, the four shift forks 80 are supported in an axially movable manner.

Figure 6:
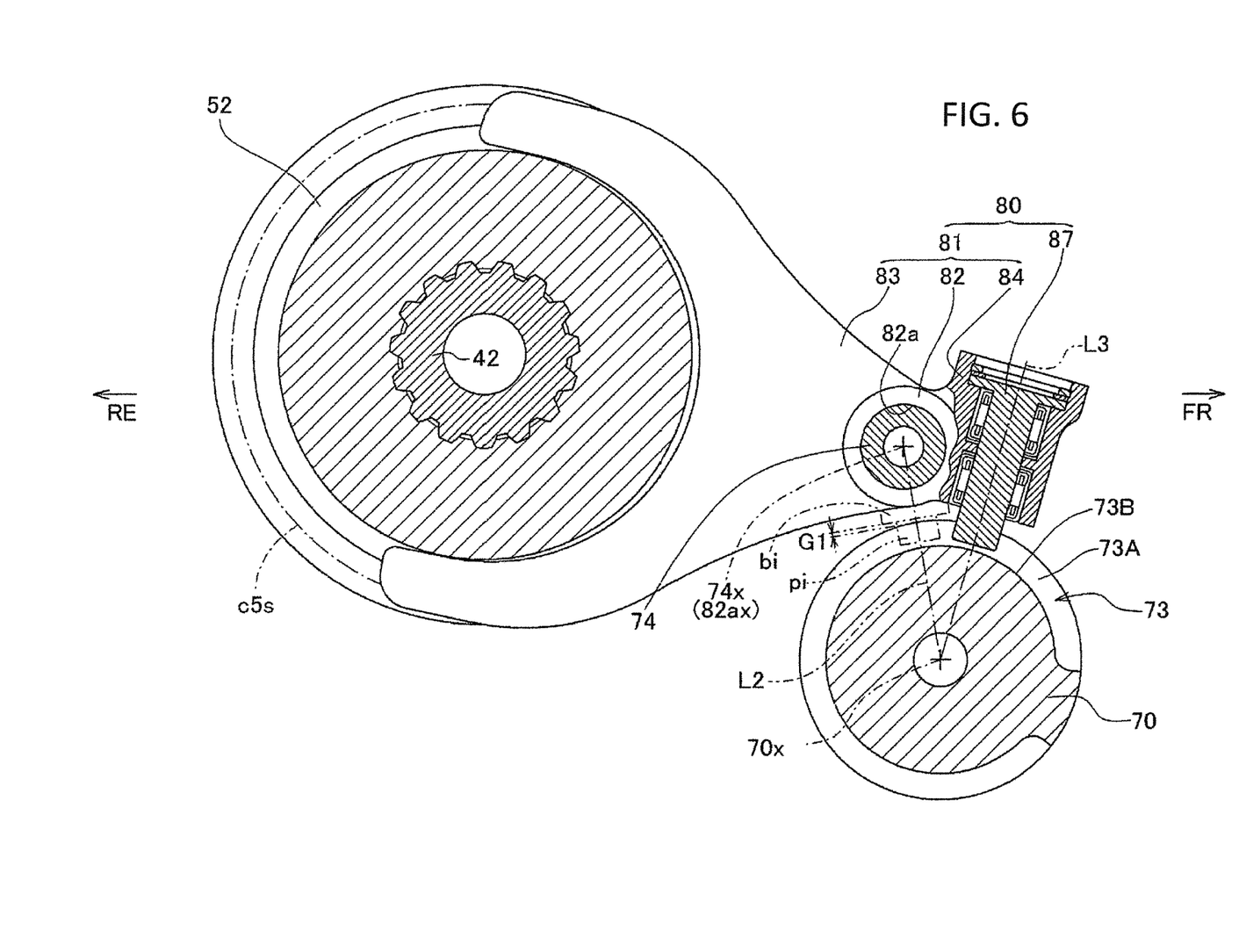
FIG. 6 is a sectional view taken along line VI-VI of FIG. 4.

As shown in FIG. 6, the shift fork 80 includes a main body portion 81, and the pin portion 87 which is a separate body from the main body portion 81.

The main body portion 81 includes: a base portion 82 formed therein with a shaft insertion hole 82a through which the shift fork shaft 74 is passed; a fork portion 83 bifurcated from the base portion 82 toward directions orthogonal to the shift fork shaft 74; and a pin mounting portion 84 provided on the opposite side of the base portion 82 from the fork portion 83.

Referring to FIG. 4 also, the fork portion 83 is in engagement with the fork groove 52 formed in each of the shifter gears m3, m4, c5, and c6.

Figure 7:
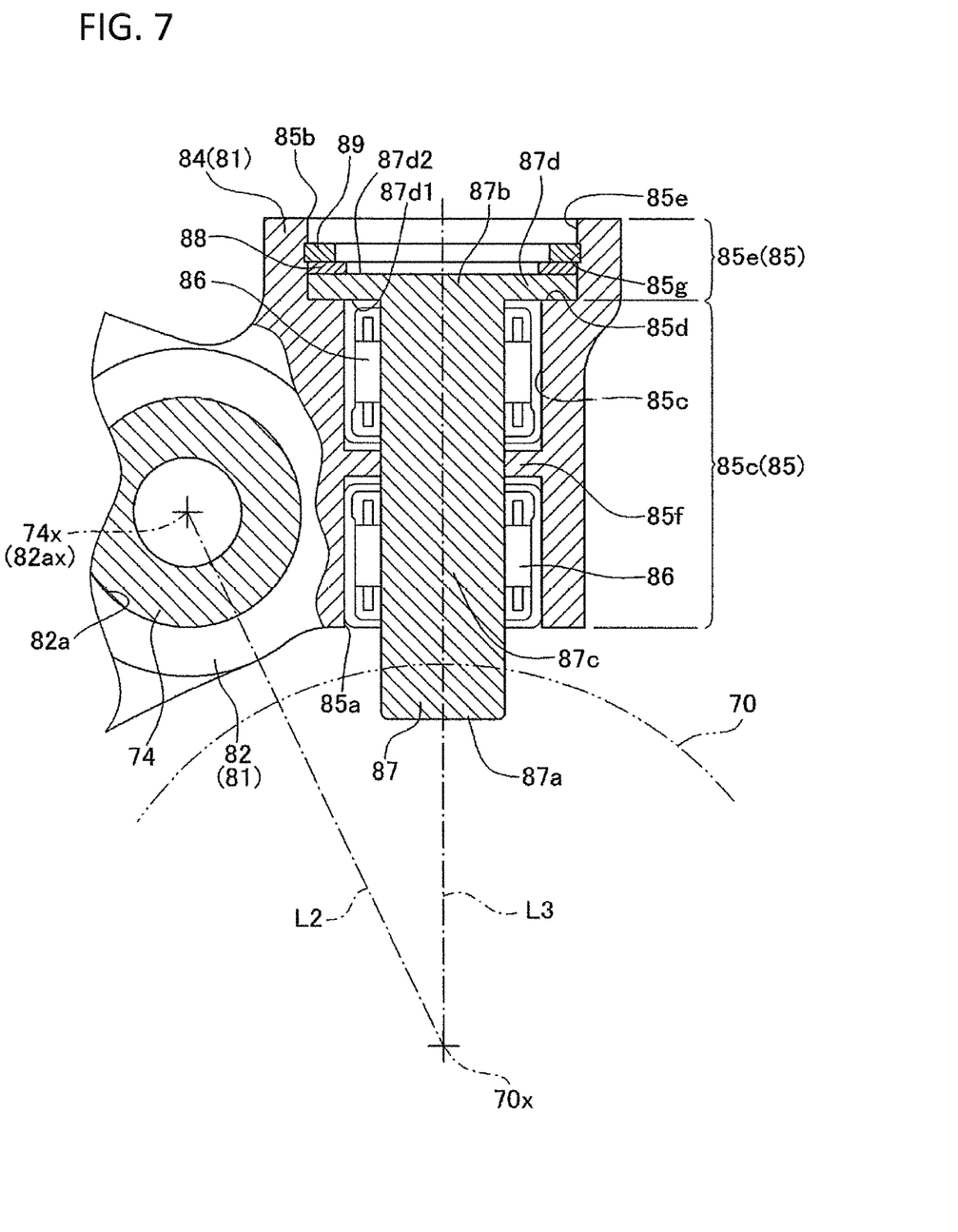
FIG. 7 is an enlarged sectional view obtained by enlarging a part of FIG. 6.

As illustrated in FIG. 7, the pin mounting portion 84 is provided therein with a pin insertion hole 85 in which the pin portion 87 is inserted. The pin insertion hole 85 penetrates the pin mounting portion 84 toward the axial center 70x of the shift drum 70, as viewed in the axial direction of the shift drum 70. The pin insertion portion 85 includes: a bearing mounting portion 85c to which the bearing member 86 is mounted; an enlarged diameter portion 85e enlarged in inside diameter as compared with the bearing mounting portion 85c; and a step portion 85d interconnecting the bearing mounting portion 85c and the enlarged diameter portion 85e.

The enlarged diameter portion 85e is provided at an end portion 85b opposite to a shift drum side end portion 85, of end portions 85a and 85b of the pin insertion hole 85. The enlarged portion 85e is formed, at the center in the direction in which the pin insertion hole 85 penetrates the pin mounting portion 84 (this direction will hereinafter referred to as the penetration direction), with a recess 85g which is recessed toward a radially outer side. The recess 85g is formed along the circumferential direction of the enlarged diameter portion 85e.

The bearing mounting portion 85c is provided to extend from the shift drum side end portion 85a, of the end portions 85a and 85b of the pin insertion hole 85, toward the enlarged diameter portion 85e provided at the end portion 85b opposite to the shift drum side end portion 85a. At the center in the penetration direction of the bearing mounting portion 85c, a projected portion 85f is formed which is projected toward a radially inner side to be reduced in diameter. Two needle bearings 86 as bearing members are mounted to the bearing mounting portion 85c, on opposite sides of the projected portion 85f.

The pin portion 87 includes a shaft portion 87c formed in a cylindrical shape, and a flange portion 87d enlarged in diameter as compared with the outside diameter of the shaft portion 87c. The flange portion 87d is provided at a base end portion 87b of the shaft portion 87c. The outside diameter of the flange portion 87d is set to be smaller than the inside diameter of the enlarged diameter portion 85e of the pin insertion hole 85 and greater than the inside diameter of the bearing mounting portion 85c.

The pin portion 87 is inserted from the enlarged diameter portion 85e side of the pin insertion hole 85, and the shaft portion 87c is supported on the bearing mounting portion 85c through the needle bearings 86. In other words, the pin portion 87 is rotatably supported on the main body portion 81 through the needle bearings 86.

The flange portion 87d of the pin portion 87 has its surface 87d1 on a tip portion 87a side put in contact with the step portion 85d of the pin insertion hole 85, whereby movement of the pin portion 87 toward the tip portion 87a side is restricted. In addition, of the flange portion 87d of the pin portion 87, a surface 87d2 on the base end portion 87b side is located on the shift drum 70 side than the recess 85g of the enlarged diameter portion 85e in the penetration direction. A retaining ring 89 is fitted in the recess 85g, to thereby restrict movement of the pin portion 87 toward the base end portion 87b side. Thus, the pin portion 87 is mounted to the main body portion 81 by the structure wherein the flange portion 87d is put in contact with the step portion 85d and wherein the retaining ring 89 is provided on the opposite side of the flange portion 87d from the step portion 85d.

Note that a washer 88 is interposed between the retaining ring 89 and the flange portion 87d of the pin portion 87, whereby friction between the retaining ring 89 and the pin portion 87 is suppressed, and rotation of the pin portion 87 is assisted.

In this way, the pin portion 87 is mounted to the main body portion 81 by the simple configuration wherein the flange portion 87d is clamped between the step portion 85d, which is formed in the pin insertion hole 85, and the retaining ring 89. Therefore, the axial length of the pin portion 87 can be held down to an intermediate portion of the enlarged diameter portion 85e, whereby the axial length of the pin portion 87 can be shortened.

As shown in FIG. 7, the tip portion 87a of the pin portion 87 protrudes from the shift drum side end portion 85a of the pin insertion hole 85 to the shift drum 70 side, and is locked in the lead groove 73 of the shift drum 70. Referring to FIG. 5 also, a slight gap is provided between the tip portion 87a of the pin portion 87 and each of the right wall surface 73A, the left wall surface 73B and the bottom wall surface 73C of the lead groove 73. With the pin portion 87 guided according to the pattern of the lead groove 73 of the shift drum 70 in conjunction with rotation of the shift drum 70, each shift fork 80 is moved on the shift fork shaft 74 in the axial direction.

As depicted in FIGS. 6 and 7, the pin portion 87 is supported on the main body portion 81, with an axial center line L3 of the pin portion 87 oriented toward the axial center 70x of the shift drum 70, as viewed in the axial direction of the shift drum 70. This axial center line L3 of the pin portion 87 is positionally deviated from and not overlapping with a line (hereinafter referred to an inter-axial-center line) L2 interconnecting the center 82ax of the shaft insertion hole 82a formed in the main body portion 81 (namely, the axial center 74x of the shift fork shaft 74) and the axial center 70x of the shift drum 70. Besides, the pin portion 87 is disposed so as to be aligned with the shift fork shaft 74 in the circumferential direction of the shift drum 70, as viewed in the axial direction of the shift drum 70.

In the case where the axial center line L3 of the pin portion 87 is made to overlap with the inter-axial-center line L2, it is necessary to dispose the pin portion 87, the needle bearings 86 and the like between the shaft insertion hole 82a and the shift drum 70. As a result, the inter-axial-center line L2 would be elongated, and it would be difficult to secure a space in which to dispose the bearing members 86. On the other hand, when the aforementioned configuration is adopted, it is possible to shorten the length of the inter-axial-center line L2 and to make the structure around the shift drum 70 compact, while disposing both the bearing members (needle bearings) 86 and the shift fork shaft 74 in the area of the main body portion 81. In addition, the degree of freedom in laying out the bearing members (needle bearings) 86 is increased, and rotation of the pin portion 87 can be carried out more smoothly.

Figure 8:
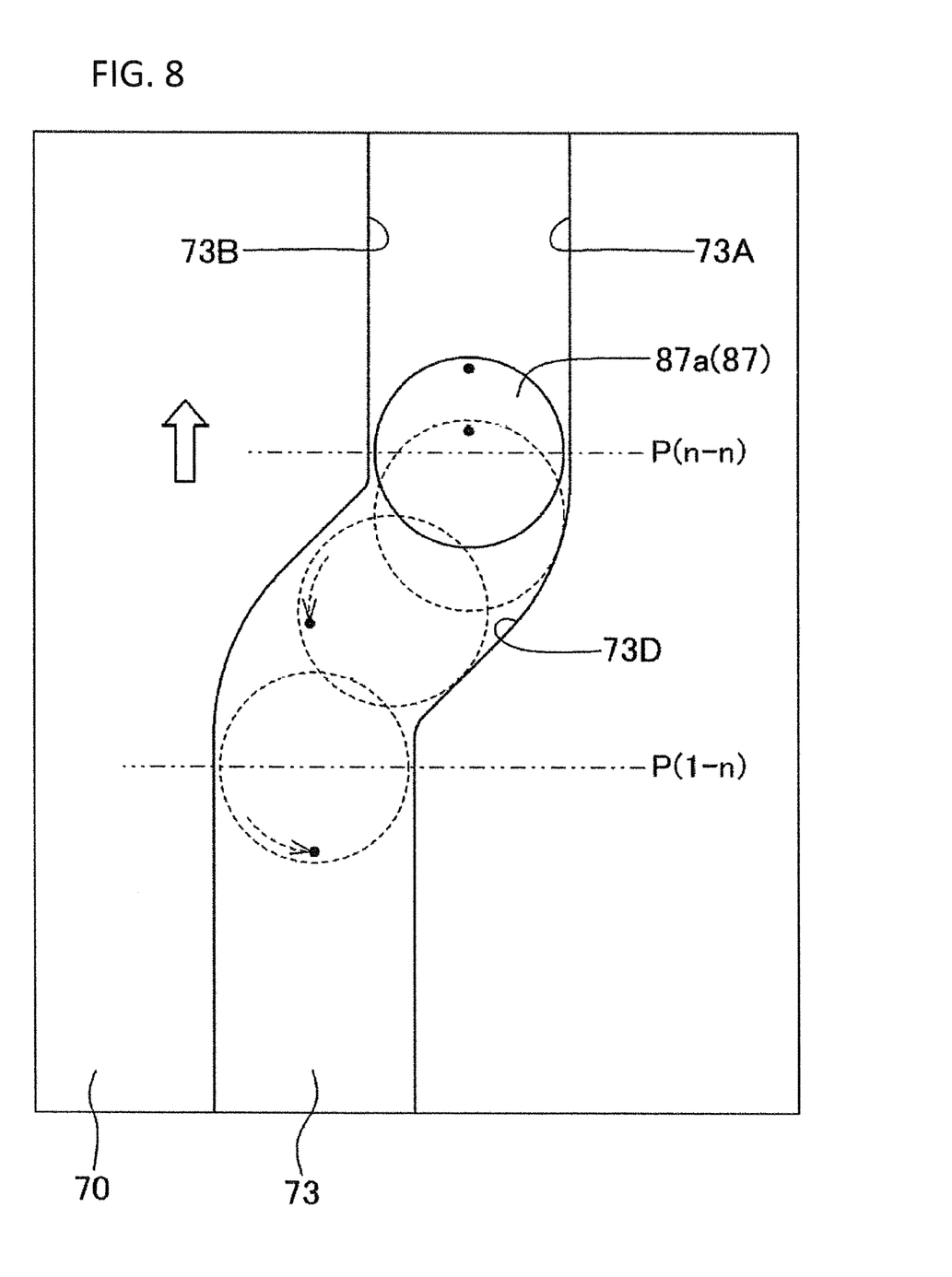
FIG. 8 is an illustration for illustrating, in a simplified form, movements of pin portions moved within the lead grooves.

Referring to FIG. 8, an operation of the pin portion 87 of the shift fork 80 configured as above will be described, taking as an example a case wherein the shift drum 70 is rotated from a state of a neutral position P(n-n) to a state of a first-speed position P(1-n).

In FIG. 8, the solid-line circle represents the tip portion 87a of the pin portion 87 before rotation of the shift drum 70, whereas the broken-line circles represent the tip portion 87a of the pin portion 87 during rotation of the shift drum 70. Note that a black point is drawn on an imaginary basis in the pin portion 87 for the purpose of making clear the motion of the pin portion 87.

When the shift drum 70 is rotated in an upshift direction indicated by a void arrow in FIG. 8, the pin portion 87 is moved relative to the lead groove 73, to come into contact with the slant wall surface 73D of the right wall surface 73A of the lead groove 73. Then, the pin portion 87 rolls on the slant wall surface 73D of the lead groove 73 while rotating counterclockwise in the drawing. The rotation of the pin portion 87 continues while the pin portion 87 remains in contact with the slant wall surface 73D, before the pin portion 87 is moved into the first-speed position P(1-n). Thus, the pin portion 87 rolls on the slant wall surface 73D, with the rotating direction changed according to the rotating direction of the shift drum 70 and the direction of the slant wall surface 73D with which the pin portion 87 makes contact.

In a conventional shift fork, a pin portion and a main portion are formed integral with each other, and the pin portion slides on the slant wall surface 73D. In this instance, friction due to sliding (hereinafter referred to as sliding friction) is generated between the outer circumferential surface of the pin portion and the slant wall surface 73D of the lead groove.

On the other hand, in the present embodiment, the pin portion 87 rolls on the slant wall surface 73D. In this case, friction due to rolling (hereinafter referred to as rolling friction) is generated between the outer circumferential surface of the pin portion 87 and the slant wall surface 73D of the lead groove 73. In general, a coefficient of friction is lower in rolling friction than in sliding friction. Accordingly, in the present embodiment, a force required for moving the shift fork 80 in the axial direction, or a torque required of the shift motor 62, can be reduced as compared to the case of the conventional shift fork.

In the speed change apparatus 4 for the power unit P according to the embodiment of the present invention as described in detail above, the following effects are obtained.

The shift fork 80 includes the main body portion 81 which is provided with the fork portion 83, and the pin portion 87 which is provided as a separate body from the main body portion 81 and rotatably supported on the main body portion 81. The pin portion 87 of the shift fork 80 moves while rolling on the slant wall surface 73D of the lead groove 73 at the time of being guided by the lead groove 73 of the shift drum 70, which is rotated by the rotational driving force of the shift motor 62. Therefore, the friction generated between the pin portion 87 and the slant wall surface 73D of the lead groove 73 is rolling friction, instead of sliding friction generated in the case of a conventional shift fork. In general, the coefficient of friction is lower in rolling contact than in sliding contact. As compared to the related art, therefore, the torque required of the shift motor 62 for moving the shift fork 80 in the axial direction can be reduced. Consequently, miniaturization of the shift motor 62 can be made.

The pin portion 87 is rotatably supported on the main body portion 81 through the needle bearings 86. Therefore, the friction generated between the pin portion 87 and the main body portion 81 at the time of rotation of the pin portion 87 is greatly reduced owing to the needle bearings 86, so that it becomes easier for the pin portion 87 to rotate. Accordingly, the frictional force in rolling friction generated between the pin portion 87 and the slant wall surface 73D of the lead groove 73 is reduced, so that the torque required of the shift motor 62 for moving the shift fork 80 in the axial direction is further reduced. Consequently, further miniaturization of the shift motor 62 can be made.

As viewed along the axial direction of the shift drum 70, the axial center line L3 of the pin portion 87 is positionally deviated from and not overlapping with the inter-axial-center line L2. Therefore, the degree of freedom in laying out the bearing members such as the needle bearings 86 is increased, and rotation of the pin portion 87 can be performed more smoothly. In addition, the length of the inter-axial-center line L2 can be shortened, as compared to the case where the pin portion 87, the needle bearings 86 and the like are disposed between the center 82ax of the shaft insertion hole 82a and the axial center 70x of the shift drum 70. Consequently, the structure around the shift drum 70 can be made compact, while disposing both the needle bearings 86 and the shift fork shaft 74 in the area of the main body portion 81.

The pin portion 87 is mounted in a state wherein the flange portion 87d formed as part of the pin portion 87 is inhibited from axial movement by the step portion 85d of the pin insertion hole 85 and the retaining ring 89 fitted in the enlarged diameter portion 85e of the pin insertion hole 85. Therefore, the pin portion 87 can be mounted to the main body portion 81 with a simple configuration, while suppressing an increase in or decreasing the axial size of the pin portion 87.

Meanwhile, the structure in which the axial center line L3 of the pin portion 87 of the shift fork 80 is positionally deviated from and not overlapping with the inter-axial-center line L2 as aforementioned has another effect from a different point of view. In the power unit P provided with the transmission 40 as in the present embodiment, shift drums and/or shift forks with different sizes according to specifications may be adopted. Besides, in a general shift fork like the one shown in Japanese Patent Laid-Open No. 2009-156375, the pin portion is formed integrally with the shift fork so as to be arranged along the inter-axial-center line. In such a general shift fork, a boss portion bi for reinforcement is formed between the pin portion pi and a base portion 82 and integrally with the base portion 82, as indicated by imaginary lines (alternate long and two short dashes lines) in FIG. 6. Besides, an appropriate gap G1 needs to be set between the outer circumferential surface 70a of the shift drum 70 and the boss portion bi.

Here, depending on the specifications of the power unit, the shift drum 70 and the shift fork boss portion bi may be so large that the gap G1 cannot be provided appropriately. In such a situation, the configuration wherein the axial center line L3 of the pin portion 87 of the shift fork 80 is positionally deviated from and not overlapping with the inter-axial-center line L2 as in the present embodiment ensures that the shift drum 70, the shift fork shaft 74 and the shift fork 80 can be laid out in a compact fashion as in the present embodiment. Note that in this case, the pin portion may be integral with or may be a separate body from the main body portion.

While one embodiment of the present invention has been described above referring to the drawings, the embodiment of the invention is not limited to the above-described embodiment, and various modifications can be made without departing from the spirit or scope of the invention.

For instance, the enlarged diameter portion 85e may be provided at the shift drum side end portion 85a of the pin insertion hole 85. In this case, the flange portion 87d is provided near the tip portion 87a instead of near the base end portion 87b of the pin portion 87, the retaining ring 89 is provided on the shift drum 70 side of the flange portion 87d, and the pin portion 87 is thereby mounted to the main body portion 81. In this case, the length of the portion of the pin portion 87 on the base end portion 87b side can be shortened.

In the present embodiment, the speed change apparatus 5 has an AMT configuration including the shift motor 62. However, a manual transmission configuration may also be adopted in which a shift pedal to be operated by foot is provided on the shift spindle 64, in place of the shift motor 62 and the speed reduction gear mechanism 63. In this case, a torque required in a foot operation can be reduced, so that energy saving and smoothening of foot operations can be realized.

Figure 9:
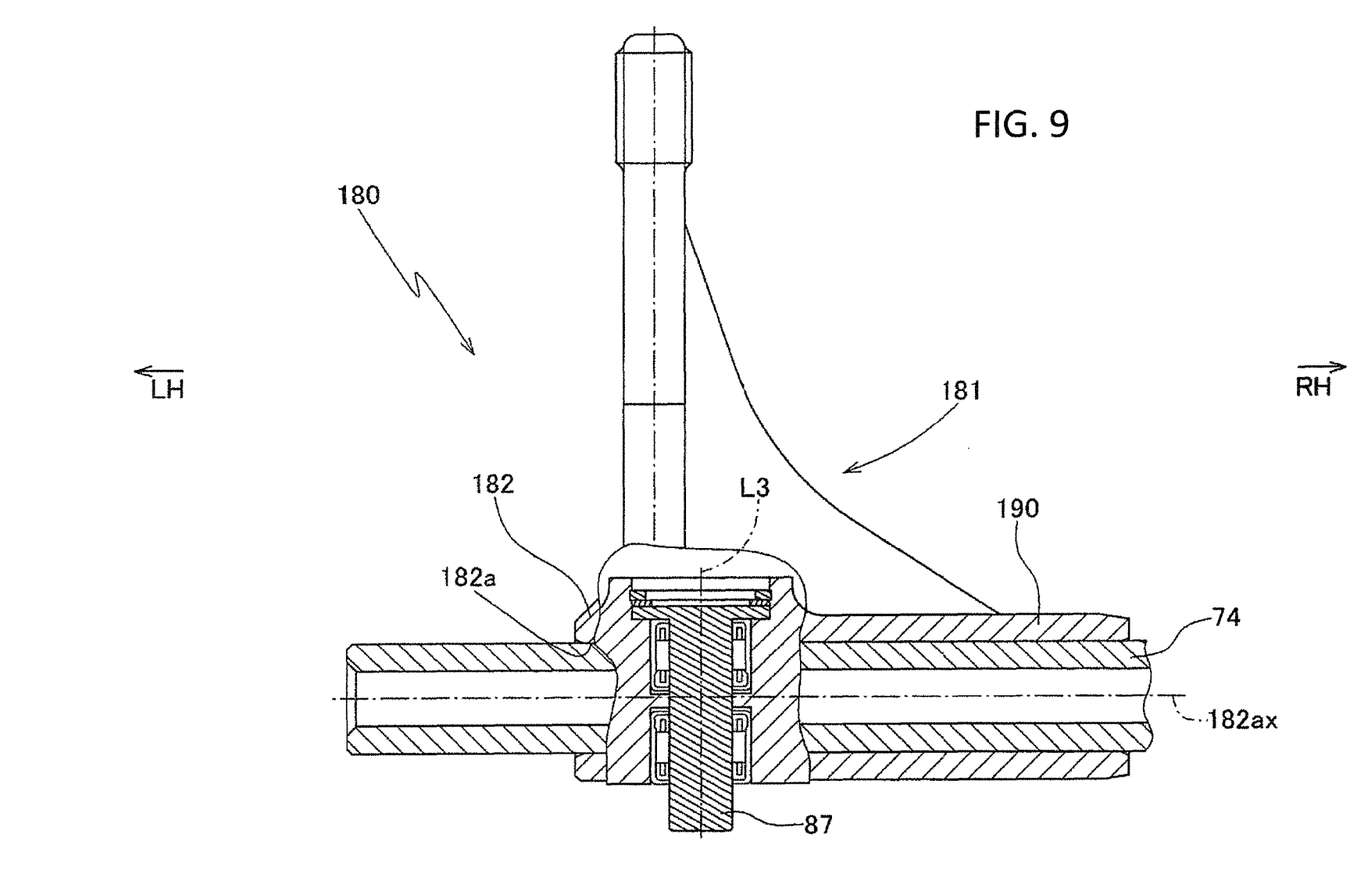
FIG. 9 is a sectional view of a shift fork used in a modification of the embodiment of the present invention.

In addition, a modification of the above-described embodiment may be adopted, as shown in FIG. 9. In this modification, a main body portion 181 of a shift fork 180 has a roughly cylindrical extension portion 190 where an opening end portion (in this modification, a right opening end portion) of a shaft insertion hole 182a formed in a base portion 182 extends along the shift fork shaft 74 in the axial direction of the shift fork shaft 74. Note that other configurations of the shift fork 180 than the base portion 182 are the same as in the above-described embodiment.

The axial center line L3 of the pin portion 87 is deviated to the front side from the inter-axial-center line L2. When the pin portion 87 is moved in the axial direction while being guided by the lead groove 73 at the time of a shift operation, therefore, a moment for rotation about the inter-axial-center line L2 is exerted on the main body portion 181 of the shift fork 180. In this modification, since the shift fork 180 is formed with the extension portion 190, the shift fork 180 is supported on the shift fork shaft 74 through a portion elongated in the axial direction owing to the provision of the extension portion 190 in addition to the base portion 182. As a result, the area of the inner circumferential surface of the shaft insertion hole 182a through which the shift fork 180 is pressed against the shift fork shaft 74 when the aforementioned moment acts thereon is enlarged, so that the forces arising from the moment can be dispersed.

According to an embodiment of the present invention, there is provided a speed change apparatus for a power unit, including: a main shaft on which a plurality of driving gears are supported; a counter shaft on which a plurality of driven gears are supported; shifter gears included in the driving gears and the driven gears; a cylindrical shift drum formed with lead grooves in an outer circumferential surface thereof; a plurality of shift forks each provided with a fork portion and a pin portion, the fork portion being engaged with the shifter gears, and the pin portion being locked in the lead groove of the shift drum; and a shift fork shaft disposed in parallel to an axial direction of the shift drum and supporting the shift forks in an axially movable manner.

A shift position is established by a process in which the shift fork guided by the lead groove of the shift drum and moved in the axial direction moves the shifter gears in the axial direction.

The speed change apparatus has a configuration in which: the shift forks each include a main body portion which is provided with the fork portion, and the pin portion of each of the shift forks is provided as a separate body from the main body portion and is rotatably supported by the main body portion.

In accordance with this configuration, when guided by the lead groove of the shift drum rotated by a rotational driving force of a shift motor or by a foot operation, the pin portion of the shift fork moves while rolling on a wall surface of the lead groove. Therefore, the friction generated between the pin portion and the wall surface of the lead groove is rolling friction, instead of sliding friction as generated in the case of a conventional shift fork. Accordingly, the force required for moving the shift fork in the axial direction can be reduced, and the torque necessary for moving the shift fork in the axial direction can be lowered. Consequently, miniaturization of the shift motor or energy saving and smoothening of the foot operations can be made.

In the above configuration, the pin portion may be rotatably supported on the main body portion through a bearing member.

In accordance with this configuration, the friction generated between the pin portion and the main body portion when the pin portion is rotated is greatly reduced owing to the bearing member, so that it becomes easier for the pin member to be rotated. Therefore, the frictional force due to rolling friction generated between the pin portion and the inner wall surface of the lead groove is reduced, whereby the torque required for the shift motor or the foot operation for moving the shift fork can be lowered. Consequently, further miniaturization of the shift motor or further energy saving and smoothening of the foot operations can be made.

In the above configuration, preferably, the main body portion is formed therein with a shaft insertion hole through which the shift fork shaft is passed, and an axial center line of the pin portion is positionally deviated from and not overlapping with a line interconnecting a center of the shaft insertion hole and an axial center of the shift drum, as viewed along the axial direction of the shift drum.

In accordance with this configuration, the degree of freedom of a space for disposing a bearing member in the main body portion is increased, whereby rotation of the pin portion can be further facilitated. In addition, since the pin portion is deviated from the line interconnecting the center of the shaft insertion hole and the axial center of the shift drum, the spacing between the shift fork shaft passed through the shaft insertion hole and the shift drum can be shortened. Consequently, the structure around the shift drum can be made compact, while disposing both the bearing member and the shift fork shaft in the area of the main body portion.

In the above configuration, preferably, a configuration is adopted in which: the main body portion is formed therein with a pin insertion hole through which the pin portion is passed; the pin insertion hole includes a bearing mounting portion to which to mount the bearing member, an enlarged diameter portion which is provided at one end of the pin insertion hole and is enlarged in inside diameter as compared with the bearing mounting portion, and a step portion connecting the bearing mounting portion and the enlarged diameter portion; the pin portion includes a shaft portion, and a flange portion which is provided at a part of the shaft portion and is enlarged in diameter as compared with an outside diameter of the shaft portion; and the pin portion passed through the pin insertion hole is mounted to the main body portion by a structure in which the flange portion is put in contact with the step portion and in which a retaining ring is provided on an opposite side of the flange portion from the step portion.

In accordance with this configuration, the pin portion can be mounted to the main body portion with a simple configuration while suppressing an increase of or decreasing the axial size of the pin portion.

In the above configuration, the main body portion of the shift fork is formed with a substantially cylindrical extension portion where an opening end portion of the shaft insertion hole extends along the shift fork shaft in the axial direction of the shift fork shaft.

In accordance with this configuration, it is possible to increase the area of the inner circumferential surface of the shaft insertion hole through which the main body portion is pressed against the shift fork when a moment for rotation about the line interconnecting the center of the shaft insertion hole and the axial center of the shift drum is exerted on the main body portion. Therefore, the forces arising from this moment can be dispersed. Accordingly, movement of the shift fork can be smoothened, while making compact the structure around the shift drum.

Obviously, numerous modifications and variations of the present invention are possible in light of the above teachings. It is therefore to be understood that within the scope of the appended claims, the invention may be practiced otherwise than as specifically described herein.

What is claimed is:

1. A speed change apparatus for a power unit, comprising:
 a main shaft on which a plurality of driving gears are supported;

a counter shaft on which a plurality of driven gears are supported;

shifter gears included in the driving gears and the driven gears;

a cylindrical shift drum formed with lead grooves in an outer circumferential surface thereof;

a plurality of shift forks each provided with a fork portion and a pin portion, the fork portion being engaged with the shifter gears, and the pin portion being locked in the lead groove of the shift drum; and a shift fork shaft disposed in parallel to an axial direction of the shift drum and supporting the shift forks in an axially movable manner, gear shift being established by a process in which the shift forks guided by the lead groove of the shift drum and moved in the axial direction moves the shifter gears in the axial direction, wherein the shift forks each includes a main body portion which is provided with the fork portion, the pin portion of each of the shift forks is provided as a separate body from the main body portion and is rotatably supported by the main body portion, the pin portion includes
a shaft portion, and a flange portion which is provided at a part of the shaft portion and is enlarged in diameter as compared with an outside diameter of the shaft portion, the main body portion includes a pin insertion hole through which the pin portion is passed, a step portion is provided in the pin insertion hole, and the flange portion is in contact with the step portion, the pin portion passed through the pin insertion hole is mounted to the main body portion by a structure in which the flange portion is put in contact with the step portion and in which a retaining ring is provided on an opposite side of the flange portion from the step portion, the pin portion is rotatably supported by the main body portion through a bearing member, and the pin insertion hole includes a bearing mounting portion to which to mount the bearing member, an enlarged diameter portion which is enlarged in inside diameter as compared with the bearing mounting portion, and the step portion connecting the bearing mounting portion and the enlarged diameter portion.

2. The speed change apparatus for a power unit according to claim 1,
wherein the main body portion includes a shaft insertion hole through which the shift fork shaft is passed; and
an axial center line of the pin portion is positionally deviated from and not overlapping with a line interconnecting a center of the shaft insertion hole and an axial center of the shift drum, as viewed along the axial direction of the shift drum.

3. The speed change apparatus for a power unit according to claim 2, wherein the main body portion of the shift fork is formed with a substantially cylindrical extension portion where an opening end portion of the shaft insertion hole extends along the shift fork shaft in the axial direction of the shift fork shaft.

4. The speed change apparatus for a power unit according to claim 1, wherein the pin insertion hole includes a projected portion provided in the bearing mounting portion, the projected portion projecting radially inward from a surface of the bearing mounting portion.

5. The speed change apparatus for a power unit according to claim 4, wherein the pin portion is rotatably supported by the main body portion through an additional bearing member, the bearing member and the additional bearing member being mounted to the bearing mounting portion on opposite sides of the projected portion.

6. A speed change apparatus for a power unit, comprising:
a main shaft rotatable around a first rotational axis to be driven by an engine;
at least one driving gear supported on the main shaft to be rotated with the main shaft;
a counter shaft rotatable around a second rotational axis substantially parallel to the first rotational axis;
at least one driven gear supported on the counter shaft to be rotated with the counter shaft, each of the at least one driven gear to be engaged with one of the at least one driving gear;
at least one of the at least one driving gear and the at least one driven gear including at least one shifter gear movable along the first rotational axis or the second rotational axis;
a cylindrical shift drum rotatable around a third rotational axis substantially parallel to the second rotational axis to be driven, the cylindrical shift drum including at least one lead groove in an outer circumferential surface of the cylindrical shift drum;
a shift fork shaft disposed opposite to the outer circumferential surface of the cylindrical shift drum not to be rotated with the cylindrical shift drum, the shift fork shaft extending in parallel to the third rotational axis;
at least one shift fork, each of the at least one shift fork comprising:
a main body portion slidably supported by the shift fork shaft, the main body portion including a fork portion to be engaged with the at least one shifter gear; and
a pin portion rotatably supported by the main body portion, the pin portion being inserted in one of the at least one lead groove of the cylindrical shift drum; and the cylindrical shift drum to be rotated to guide the pin portion of the at least one shift fork along the one of the at least one lead groove to move the at least one shift fork in a direction parallel to the third rotational axis to shift the at least one shifter gear along the first rotational axis or the second rotational axis, wherein the pin portion includes:
a shaft portion; and
a flange portion which is provided at a part of the shaft portion and is enlarged in diameter as compared with an outside diameter of the shaft portion, the main body portion includes a pin insertion hole through which the pin portion is passed, a step portion is provided in the pin insertion hole, and the flange portion is in contact with the step portion, the pin portion passed through the pin insertion hole is mounted to the main body portion by a structure in which the flange portion is put in contact with the step portion and in which a retaining ring is provided on an opposite side of the flange portion from the step portion, the pin portion is rotatably supported by the main body portion through a bearing member, and wherein the pin insertion hole includes:
a bearing mounting portion to which to mount a bearing member;
an enlarged diameter portion which is enlarged in inside diameter as compared with the bearing mounting portion; and the step portion connecting the bearing mounting portion and the enlarged diameter portion.

7. The speed change apparatus for a power unit according to claim 6,
wherein the main body portion includes a shaft insertion hole through which the shift fork shaft is passed; and
an axial center line of the pin portion is positionally deviated from and not overlapping with a line interconnecting a center of the shaft insertion hole and the third rotational axis, as viewed along the third rotational axis.

8. The speed change apparatus for a power unit according to claim 7, wherein the main body portion of the at least one shift fork is formed with a substantially cylindrical extension portion where an opening end portion of the shaft insertion hole extends along the shift fork shaft.

9. The speed change apparatus for a power unit according to claim 6, wherein the pin insertion hole includes a projected portion provided in the bearing mounting portion, the projected portion projecting radially inward from a surface of the bearing mounting portion.

10. The speed change apparatus for a power unit according to claim 9, wherein the pin portion is rotatably supported by the main body portion through an additional bearing member, the bearing member and the additional bearing member being mounted to the bearing mounting portion on opposite sides of the projected portion.

\* \* \* \* \*